United States Patent [19]
Casper

[11] Patent Number: 5,996,240
[45] Date of Patent: Dec. 7, 1999

[54] GAUGE FOR RECORDING A PERSON'S GROWTH

[75] Inventor: William P. Casper, Fond du Lac, Wis.

[73] Assignee: Casper Enterprises, Inc., Fond du Lac, Wis.

[21] Appl. No.: 08/863,342

[22] Filed: May 27, 1997

[51] Int. Cl.[6] .............................. G01B 3/10; G01C 5/00
[52] U.S. Cl. .............................. 33/759; 33/512; 33/761; 33/770
[58] Field of Search .............................. 33/759, 511, 512, 33/515, 755, 760, 761, 768, 769, 770

[56] References Cited

U.S. PATENT DOCUMENTS

| | | | |
|---|---|---|---|
| 1,189,257 | 7/1916 | Kastmann | 242/582 |
| 1,974,085 | 9/1934 | Shields et al. | 33/169 |
| 2,893,656 | 7/1959 | Carlson | 242/396.9 |
| 2,914,269 | 11/1959 | Freeman | 242/405 |
| 3,020,643 | 2/1962 | Moran | 33/138 |
| 3,144,717 | 8/1964 | Gumaelius | 33/759 |
| 3,336,674 | 8/1967 | Higgins et al. | 33/138 |
| 3,695,553 | 10/1972 | Everett | 242/341 |
| 3,802,638 | 4/1974 | Dragan | 242/586.2 |
| 3,921,322 | 11/1975 | Sharp | 40/405 |
| 3,925,901 | 12/1975 | McCormick | 33/759 |
| 4,058,215 | 11/1977 | Marchbank | 206/574 |
| 4,412,384 | 11/1983 | Viets | 33/512 |
| 4,479,318 | 10/1984 | Russell | 40/788 |
| 5,385,315 | 1/1995 | Rude et al. | 242/586 |

FOREIGN PATENT DOCUMENTS 278983  2/1952  Switzerland .............................. 33/511

Primary Examiner—Diego Gutierrez
Assistant Examiner—R A Smith
Attorney, Agent, or Firm—Donald Cayen

[57] ABSTRACT

A gauge for measuring and recording a child's growth comprises a housing, a ribbon, and a foot plate. One end of the ribbon is attached to a shaft in a housing chamber by a first pin that passes through a ribbon first loop and through the shaft. The other end of the ribbon is secured to the foot plate by a second pin that passes through a ribbon second loop and through the foot plate. The ends of the ribbons are located within respective slots in the shaft and the foot plate. The shaft is journaled at one end in a side wall of the housing and at the other end in a cap that closes the housing chamber. The ribbon passes through a slit in a bottom wall of the housing chamber. The gauge includes a level that assures the housing is horizontal when it is used. The housing and foot plate have peripheries that are coincident when the gauge is in a stored mode.

5 Claims, 2 Drawing Sheets

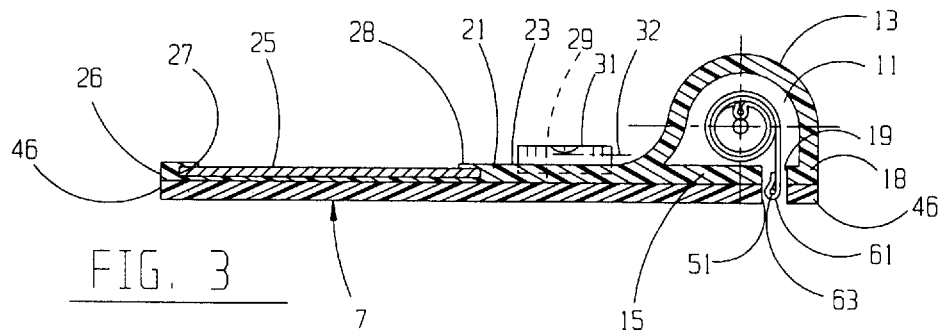
FIG. 3
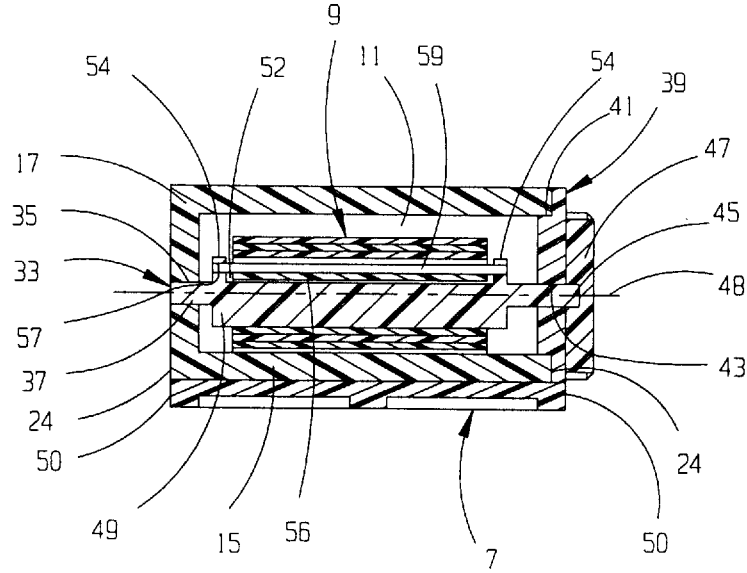
FIG. 4
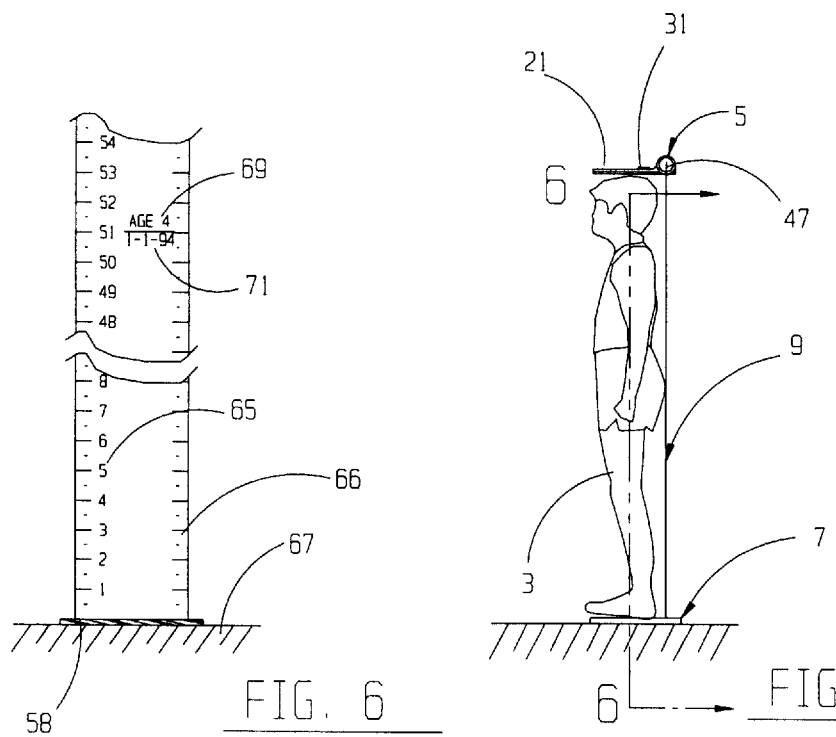
FIG. 6
FIG. 5

GAUGE FOR RECORDING A PERSON'S GROWTH

BACKGROUND OF THE INVENTION

This invention pertains to measuring devices, and more particularly to apparatus that measures and stores data pertaining to a child's height.

DESCRIPTION OF THE PRIOR ART

It is well known to periodically measure the height of a child and to record that height. For example, marks can be placed on a wall that indicate the heights of the child at different times during his growing years.

Specialized measuring and recording devices have been developed to measure and record a person's height. For example, U.S. Pat. No. 1,974,085 shows a foldable chart. U.S. Pat. Nos. 2,197,031; 3,144,717; and 3,336,674 show roll-up tapes. By placing the chart or tape alongside the person, a mark can be inscribed on it at a location coinciding with the height of the person. Foot pads rigidly attached to the respective charts or tapes are part of the devices of the U.S. Pat. Nos. 1,974,085; 3,144,717; and 3,336,674. The foot pad of the U.S. Pat. No. 3,336,674 is very narrow. The foot pads are placed on a floor and under a person's foot, thereby holding the charts or tapes in place during the measurement process.

U.S. Pat. No. 3,020,643 describes a wide sheet rolled inside a large housing. A foot plate on the end of the sheet serves to close the housing. The device of the U.S. Pat. No. 3,020,643 is limited to measuring the lengths of infants lying on a table or the like.

U.S. Pat. No. 5,033,202 shows a rather sophisticated height gauge. No means for recording the height directly on the device is included.

Although prior devices for measuring and recording heights of persons are available, it nevertheless is considered desirable to improve them.

SUMMARY OF THE INVENTION

In accordance with the present invention, a gauge for recording a person's growth is provided that is more attractive and easier to use than similar prior devices. This is accomplished by apparatus that includes a housing having a chamber and a flange, and a foot plate having the same periphery as the housing.

The housing chamber has a bottom wall and one side wall. The housing flange is an extension of the chamber bottom wall. The housing side wall and a cap rotatably support a slotted shaft. A flexible ribbon has a looped first end that is located within the shaft slot. A long first pin passing through the loop in the ribbon first end attaches the ribbon to the shaft. The ribbon extends through a slit in the chamber bottom wall.

The foot plate is secured to the second end of the ribbon by a second long pin passing through a loop in the ribbon. The loop in the ribbon second end is located in a slot in the foot plate.

By rotating the shaft by means of a knob on the outside of the housing, the ribbon can be wound onto the shaft inside the housing chamber. When the ribbon is fully wound onto the shaft, the foot plate is flush against the chamber bottom wall and the flange to place the gauge in a stored mode. Since the housing and the foot plate have coincident peripheries, the gauge has a compact and neat appearance when it is in the stored mode.

The ribbon is permanently inscribed with markings indicating length measurements. For example, the ribbon can be inscribed with lines indicating inches measured from the foot plate. The ribbon is made of a material that is able to receive markings from a pen or pencil. Space is available on the ribbon for a person to write desired information on it.

The housing flange has a top surface that defines a shallow pocket. Small tabs overlie portions of the pocket around the pocket perimeter. A paper card, photograph, or the like is placeable in the pocket and retained there by the tabs. The flange top surface is also formed with a recess that snugly holds a bubble level. The longitudinal axis of the level is parallel to the plane of the flange and perpendicular to the plane of the ribbon.

The gauge of the invention is used by imprinting personal data, such as the name and birth date, of a person, such as a child, onto a card. A photograph of the child can be a part of the card. The card is placed in the pocket in the housing flange and indefinitely retained there by the tabs. At selected times during the person's childhood, the gauge is used to measure and record his height. To do so, the foot plate is pulled away from the housing such that the ribbon unwinds from the shaft. The foot plate is placed on a horizontal surface. The child places the heel of one foot on the foot plate. The ribbon is stretched alongside the child, and the housing flange is placed on his head. The level on the housing assures accurate placement of the flange. The intersection of the housing with the ribbon indicates the child's height. A mark is made there on the ribbon. Any of several desired pieces of information are written on the ribbon proximate the height marking. Thereafter, the ribbon is rewound onto the shaft. The gauge is stored for safe keeping until it is to be used again.

The method and apparatus of the invention, using a housing having a large flange and a level, thus accurately measures and records the height of a person. The looped connections of the ribbon with the foot plate and with the shaft assure long life for the ribbon, even though it is frequently pulled from and wound into the housing.

Other advantages, benefits, and features of the present invention will become apparent to those skilled in the art upon reading the detailed description of the invention.

BRIEF DESCRIPTION OF THE DRAWINGS

FIG. 3 is a cross sectional view taken along line 3—3 of FIG. 1.

FIG. 4 is a cross sectional view taken along line 4—4 of FIG. 1.

FIG. 5 is a view showing the invention in use.

FIG. 6 is a partial view taken along line 6—6 of FIG. 5.

DETAILED DESCRIPTION OF THE PREFERRED EMBODIMENT

Although the diclousure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
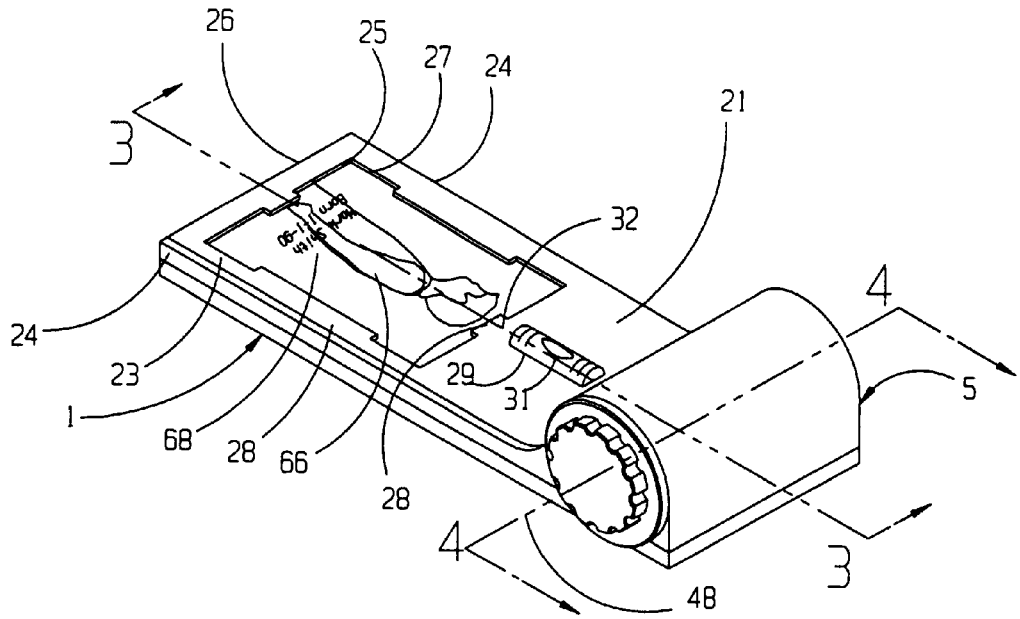
FIG. 1 is a top perspective view of the invention in its stored mode.
Figure 2:
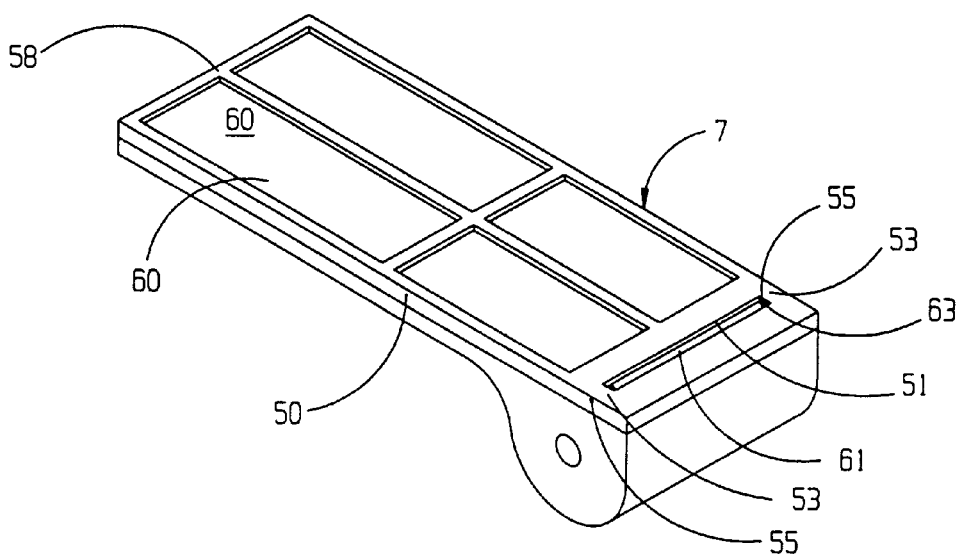
FIG. 2 is a bottom perspective view of the invention in its stored mode.

Referring to FIGS. 1–5, a gauge 1 for measuring and recording personnal data is illustated that includes the present invention. The gauge 1 is particularly useful for measuring and recording the height of a growing child 3.

The gauge 1 is comprised of a housing 5, a foot plate 7, and a flexible ribbon 9 that extends between the housing and the foot plate. The housing 5 has a chamber 11 that is bounded by a generally U-shaped top wall 13 having a back portion 18, a bottom wall 15, and a side wall 17. There is slit 19 in the chamber bottom wall 15.

The housing 5 further has a flange 21 that is a coplanar extension of the chamber bottom wall 15. The flange 21 has a top surface 23, opposed side edges 24, and an end edge 26. The flange top surface 23 defines a shallow pocket 25 with a perimeter 27. Small tabs 28 protrude from the perimeter 27 to partially overlie the pocket 25. The flange top surface is further formed with a rectangular recess 29. A bubble level 31 is held, as by an adhesive, in the recess 29. The recess is formed in the flange such that the level longitudinal axis 32 is parallel to the plane of the flange and also to the flange side edges 24. Suitable dimensions for the housing are approximately three inches in width between the side edges 24, and 6½ inches in length between the chamber top wall back portion 18 and the flange end edge 26. The slit 19 may be approximately 2.63 inches long and 0.06 inches wide.

Rotatably supported within the housing chamber 11 is a shaft 33. The chamber side wall 17 has a hole 35 that serves as a journal for a first hub 37 of the shaft 33. A cap 39 with a pilot 41 closes the housing chamber opposite the side wall 17. The pilot 41 has a hole 43 therethrough that serves as a journal for a second hub 45 of the shaft. A hand knob 47 is joined to the shaft second hub 45 on the outside of the cap 39.

The shaft 33 has a cylindrical portion 49 between the two hubs 37 and 45. The cylindrical portion 49 and the hubs are symmetrical about a longitudinal axis 48. In the hub cylindrical portion is a longitudinally extending slot 52. The slot 52 does not extend for the full length of the cylindrical portion. Rather, there are short end sections 54 at the opposite ends of the slot. Small holes 57 are drilled through the end sections 54 parallel to the slot.

The foot plate 7 has the same periphery as the housing 5. That is, the foot plate has two side edges 50 that are spaced apart the same width as the housing side edges 24, and end edges 46 that are spaced apart the same distance as the housing end edge 26 and top wall back portion 18. The foot plate bottom surface 58 preferably has four shallow recesses 60. There is a slot 51 through the foot plate perpendicular to and extending for most of the distance between the side edges 50. Consequently, there are a pair of short end sections 53 between the ends of the slot 51 and the side edges. Small holes 55 are drilled through the sections 53 parallel to the slot.

One end 56 of the ribbon 9 is attached to the shaft 33. For that purpose, the end 56 of the ribbon is formed into a loop. The loop at end 56 is located in the shaft slot 52. A long pin 59 is passed through the holes 57 in the shaft end sections 54 and also through the ribbon loop. A slight crimp to the pin 59 locks it in place in the shaft.

The second end 61 of the ribbon 9 is secured to the foot plate 7. To do so, the ribbon second end 61 is looped and placed in the slot 51 in the foot plate. A long pin 63 is inserted through the holes 55 in the foot plate end sections 53 and through the ribbon second end loop. It will be understood that the assembly of the ribbon first end 56 to the shaft 33 takes place outside of the housing 5, and that the ribbon 9 is passed through the housing slit 19 before the ribbon second end 61 is secured to the foot plate.

The ribbon 9 may be any length. I anticipate that a length of approximately 70 inches will be suitable for most applications. A width of 2.50 inches for the ribbon is satisfactory. The ribbon is made of a material that permanently accepts writings from a pen or pencil. The ribbon is initially inscribed along its edges with markings 65, 66 that represent distances from the foot plate bottom surface 58, FIG. 6. As illustrated, the markings 65 are in inches, and the markings 66 are in centimeters.

A gauge 1 is personal to a particular child 3. Personalization is achieved by placing a photograph 66 of the child within the pocket 25 in the housing flange 21. The tabs 28 retain the photograph 66 in place. Other personal information 68, such as the child's name and birth date, can also be placed in the pocket.

FIGS. 1–4 show the gauge 1 in a stored mode. In the stored mode, the ribbon 9 is fully wound onto the shaft 33 by turning the knob 47. The ribbon is thus safely protected in the housing chamber 11. The foot plate 7 is flush against the housing flange 21 and chamber bottom wall 15.

By pulling the foot plate 7 away from the housing 5, the ribbon 9 unwinds from the shaft 33 to an operative mode, FIG. 5. The foot plate is placed on a floor 67 or other horizontal surface. The child 3 places a foot on the foot plate. The housing is pulled away from the foot plate until the housing flange 21 is even with the top of the child's head. The housing is placed on the child's head. The knob 47 is turned to place a slight tension on the ribbon. The level 31 assures that the flange is horizontal. The child, or a second person, not shown, inscribes a mark 69 on the ribbon at its intersection with the bottom wall 15 of the housing chamber 11. The child 3 need not stand against a wall for his measurement to be taken. The location of the mark 69 relative to the distance markings 65, 66 indicates the height of the child. The gauge is removed from the child. The ribbon is pulled a little more from the housing. Other desired markings 71, such as the date of the measurement and the age of the child, can be inscribed on the ribbon adjacent the height mark. Later, the knob 47 is rotated to wind the ribbon back into the housing and return the gauge to the stored mode of FIGS. 1–4. The gauge is then stored safely until it is to be used again.

In summary, the joys of watching children grow can now be more fully realized. The gauge 1 provides both a means to measure height-related data concerning a child and a means for recording and preserving the data. This desirable result comes from using the combined functions of the ribbon 9 and the housing 5. The housing permanently and safely stores the ribbon in the housing chamber 11 when the gauge is in the stored mode. In that situation, the foot plate 7 is in flat facing contact with the housing to form a neat and attractive package. At any desired time, the gauge can be placed in the operative mode by pulling the ribbon from the housing chamber. The gauge containing the record of the child's development over the years soon becomes a family heirloom.

It will also be recognized that in addition to the superior performance of the invention, its cost of construction is modest. Also, because the gauge 1 is made of a simple design and of rugged components, it will last as a family memento for many generations.

Thus, it is apparent that there has been provided, in accordance with the invention, a gauge for recording a person's growth that fully satisfies the aims and advantages set forth above. While the invention has been described in conjunction with specific embodiments thereof, it is evident that many alternatives, modifications, and variations will be apparent to those skilled in the art in light of the foregoing description.

According, it is intended to embrace all such alternatives, modifications, and variations as fall within the spirit and broad scope of the appended claims.

I claim:

1. A gauge for recording a person's growth comprising:
   a. a housing comprising:
      i. a chamber defined by a bottom wall having a slit therethrough, an end wall, and a top wall; and
      ii. a planar flange coplanar with the chamber bottom wall, the flange and the chamber bottom wall having a predetermined periphery;
   b. a foot plate having the same periphery as the housing chamber bottom wall and flange, the foot plate having a slot therein, the slot in the foot plate is bounded on oppoosite ends thereof by foot plate end sections;
   c. shaft means for rotating in the housing chamber and having a slot therein, wherein the slot in the shaft means is bounded on opposite ends thereof by shaft end sections;
   d. an elongated flexible ribbon passing through the slit in the housing chamber bottom wall and having a first end with a first loop that is located in the slot in the shaft means and a second end with a second loop that is located in the slot in the foot plate, the ribbon being inscribed with distance-related indicia;
   e. first pin means for attaching the ribbon first end to the shaft means, wherein the first pin means comprises a first pin passing through the shaft end sections and through the first loop in the ribbon first end; and
   f. second pin means for securing the ribbon second end to the foot plate, wherein the second pin means comprises a second pin passing through the foot plate end sections and through the second loop in the ribbon second end.

2. Apparatus for measuring and recording the height of a child comprising;
   a. a housing having a bottom wall with a slit therethrough and a planar flange coplanar with the housing bottom wall;
   b. an elongated ribbon having first and second ends and inscribed with indicia relating to length measurements;
   c. a shaft defining a longitudinal axis and having a first hub rotatable supported in the housing and a second hub, the ribbon first end being attached to the shaft, wherein the shaft defines a first slot;
   d. cap means for cooperating with the housing to rotatable support the shaft second hub; and
   e. a foot plate, the ribbon second end being secured to the foot plate, wherein the foot plate defines a second slot wherein:
      i. the ribbon first end has a first loop that is located in the first slot;
      ii. the ribbon second end has a second loop that is located in the second slot;
      iii. the ribbon first end is attached to the shaft by a first pin passing through the loop in the ribbon first end and through the shaft; and
      iv. the ribbon second end is secured to the foot plate by a second pin passing through the loop in the ribbon end and through the foot plate.

3. Apparatus for measuring and recording the height of a child comprising:
   a. a housing having a bottom wall with a slit therethrough and a planar flange coplanar with the housing bottom wall;
   b. an elongated ribbon having first and second ends and inscribed with indicia relating to length measurements;
   c. a shaft defining a shaft slot and a longitudinal axis and having a first hub rotatable supported in the housing and a second hub, the ribbon first end being attached to the shaft;
   d. cap means for cooperating with the housing to rotatable support the shaft second hub; and
   e. a foot plate defining a foot plate slot, the ribbon second end being secured to the foot plate, wherein:
      the shaft defines shaft end sections at the opposite ends of the shaft slot, and the foot plate defines foot plate end sections at the opposite ends of the foot plate slot;
      the ribbon first and second ends have first and second loops, respectively;
      a first pin passes through the shaft end sections and through the ribbon first loop to thereby attach the ribbon first end to the shaft; and
      a second pin passes through the foot plate end sections and through the ribbon second loop to thereby secure the ribbon second end to the foot plate.

4. A gauge for measuring and recording the height of a child comprising:
   a. an elongated flexible ribbon having first and second ends with first and second loops, respectively, the ribbon being imprinted with height-related indicia and markable with selected data pertaining to the child;
   b. a shaft having opposed first and second hubs and defining a slot, the ribbon first loop being located in the shaft slot;
   c. a first pin passing through the shaft and through the ribbon first loop to thereby attach the ribbon first end to the shaft;
   d. a housing comprising:
      i. a top wall, a bottom wall, and a side wall that cooperate to define a chamber, the bottom wall having a slit therethrough, the side wall having a hole therein that receives the shaft first hub; and
      ii. a planar flange that is a coplanar extension of the housing bottom wall, the housing planar flange being placeable on the child's head;
   e. a cap assembled to the housing opposite the housing side wall, the cap having a hole that receives the shaft second hub, the ribbon passing through the slit in the housing bottom wall when the shaft hubs are received in the housing side wall and in the cap;
   f. a foot plate that defines a slot, the ribbon second loop being located in the foot plate slot; and
   g. a second pin passing through the foot plate and through the ribbon second loop to thereby secure the ribbon second end to the foot plate.

5. A method of making a gauge for measuring the height of a person comprising:
   a. providing a housing with a bottom wall with a slit therein, a side wall, and a top wall that cooperate to define a chamber, and a planar flange coplanar with the bottom wall;
   b. providing an elongated ribbon having first and second ends with respective first and second loops therein;
   c. providing a shaft having first and second hubs and having a slot therein;
   d. locating the ribbon first loop in the shaft slot;
   e. passing a first pin through the shaft and through the ribbon first loop and thereby attaching the ribbon first end to the shaft;

f. passing the ribbon through the slit in the housing bottom wall and simultaneously journaling the shaft first hub in the housing side wall;
g. closing the housing chamber opposite the side wall thereof with a cap and simultaneously journaling the shaft second hub in the cap;
h. providing a foot plate with a slot therein;
i. locating the ribbon second loop in the foot plate slot; and
g. passing a second pin through the foot plate and through the ribbon second loop and thereby securing the ribbon second end to the foot plate.

* * * * *